(12) United States Patent
Kao et al.

(10) Patent No.: US 6,310,688 B1
(45) Date of Patent: Oct. 30, 2001

(54) METHOD FOR MEASURING THE PARAMETER OF A ROUGH FILM

(75) Inventors: Ming-Kuan Kao, Hsinchu; Jason C. S. Chu, Taipei, both of (TW)

(73) Assignee: Mosel Vitelic Inc., Hsinchu (TW)

( * ) Notice: Subject to any disclaimer, the term of this patent is extended or adjusted under 35 U.S.C. 154(b) by 0 days.

(21) Appl. No.: 09/131,405

(22) Filed: Aug. 10, 1998

(30) Foreign Application Priority Data

Jul. 3, 1998 (TW) .................................................. 87110759

(51) Int. Cl.[7] ........................................................ G01J 4/00
(52) U.S. Cl. ............................................. 356/369; 356/600
(58) Field of Search .................................... 356/371, 394, 356/445–448, 369, 237.1, 237.2, 237.3, 237.4, 237.5, 600; 257/309, 534

(56) References Cited

U.S. PATENT DOCUMENTS

| 5,796,484 | * | 8/1998 | Honma et al. | 356/371 |
| 5,825,498 | * | 10/1998 | Thakur et al. | 356/394 |
| 5,835,225 | * | 11/1998 | Thakur | 356/381 |
| 5,850,288 | * | 12/1998 | Honma et al. | 356/371 |
| 6,034,778 | * | 3/2000 | Shin et al. | 356/371 |

* cited by examiner

Primary Examiner—Hoa Q. Pham
(74) Attorney, Agent, or Firm—Bacon & Thomas

(57) ABSTRACT

A method for measuring the parameter of a rough film is presented in this invention. In which the optical property of a rough film is further defined by utilizing the characteristics of an optical instrument and silicon film, without disturbance from noise in measurement. Therefore, good or bad the rough film is can be detected effectively, further, a handy method can be offered to control the stability in the manufacturing process. The invention is performed by choosing a measuring light with wavelength in a certain range and an optical instrument, then comparing the result with a standard value to monitor the result of the manufacturing process of the rough film.

6 Claims, 4 Drawing Sheets

METHOD FOR MEASURING THE PARAMETER OF A ROUGH FILM

BACKGROUND OF THE INVENTION

1. Field of the Invention

This invention relates to a method for measuring the parameter of a rough film, and more particularly, to a method of monitoring the manufacturing process of rough film by using a measuring light with wavelength in a certain range and a spectroscopic ellipsometer (SEM) as the measuring instrument.

2. Description of the Prior Art

Currently, with the giant advancement in semiconductor technology, the integration density of the integrated circuits has been tremendously increased. Generally speaking, the enhancement in the integration density of the integrated circuits requires a corresponding improvement in their manufacturing process. For example, the capacitor in a dynamic random access memory (DRAM) has to provide a higher capacitance without reducing the integration density. However, the diminution of capacitance will result from the decrease of capacitor surface area when the device area gets smaller. Therefore, other ways of manufacturing DRAM are necessary to increase the capacitance efficiently but still meet the requirements of a smaller device area. This will result in a few obvious benefits, such as the efficient increase of DRAM refresh time and, power saving due to the lowering of memory consuming power. On the contrary, if the capacitance fails to be increased, the refresh time of memory can't be increased efficiently either, then data access will be degraded.

In general, a roughening technique, that is, increasing the capacitor surface-area is used to enhance the capacitance of a capacitor in the integrated circuits, which is the main technology to make stack DRAMs and is called hemispherical grain silicon (HSG). The cross-sectional view of the process diagram is shown in FIG. 1, in which amorphous silicon 10 in a device is fonned as a rough film 15 (hemispherical grain) after annealing according to the prior art. However, though the HSG technique can enhance capacitance effectively, monitoring the process is difficult and controlling roughness with good quality control of HSG stability in manufacturing process is almost impossible.

In another aspect, although the technique of selective HSG has dominated the methods of fonning stack DRAM, due to the special structure of hemi-spherical grain, there is a need to provide a cheap in-line control method when applying this technique. If in-line scanning electron microscopy (SEM) is used as the inspecting tool, the problems are high cost, limited throughput, and the biggest-good control of process stability. Because it is very subjective and hard to make a judgment whether the manufacturing process is good or bad under scanning electron microscopy, thus SPC control will be very difficult. Besides, general optical methods have the following restrictions:

1. Microscopic roughness and non-homogeneous make it inefficient to get the optical property of films by optical measurement.
2. Because HSG, that is, a rough film is fonned by crystal growth, the properties of amorphous silicon, such as the refractive coefficient, the extinction coefficient, and the thickness of bottom layer will directly disturb the correct measurement. So, all the disturbances have to be removed first to make the measurement indicative of the property of a rough film.

Therefore, a convenient and simple way to measure the parameter of a rough film is necessary to be developed that the influence from the bottom layer can be got rid of and moreover, the property of the rough film can be accurately measured.

SUMMARY OF THE INVENTION

A convenient method is therefore presented in this invention to improve the former problems and further, measure the parameter of a rough film. This method is particularly suitable for the technology used in enhancing capacitance of a capacitor by HSG, so that the property of a rough film and whether or not it is stable can be assessed efficiently for further treatment.

It is therefore the main object of this invention to provide an available method for measuring the parameter of a rough film that engineers can get a handy way to measure the parameter of a rough film, especially relating to the manufacturing process of a capacitor.

It is therefore another object of this invention to correctly measure the property of a rough film, in which the influence from the bottom layer has been eliminated, so that the property of the rough film can be detected accurately.

The method for measuring the parameter of a rough film has the following steps. At first, a chip with an uneven film is prepared, then a measuring light with wavelength in a certain range is chosen to detect the optical property for assessing how good or bad the manufacturing process is. An uneven film just mentioned is a rough film and the optical instrument used for measuring is a spectroscopic ellipsometer (SEM).

Preferably, the method for measuring the parameter of a rough film includes the following steps. At first, the value of a first standard is taken as a base, and the values of a second standard and a measured one are subsequently taken, then a controlled value is derived from one formula. The formula is stated as:

Measured value=[(1−controlled value) ×the first standard]+[controlled value×the second standard]

In a preferred manner, the method for measuring the parameter of a rough film is completed according to the following steps. Firstly, an object with an uneven film, that is, a rough film is prepared, in which both a concave-convex layer and a bottom layer are included. Afterwards, the concave-convex layer can be macroscopically treated as a smooth virtual layer, in (which the thickness of the virtual layer is exactly the height difference of the concave-convex layer. Therefore, the mentioned rough film can be viewed as a smooth compound film comprising the mentioned virtual layer and bottom layer. Then, a measuring light is selected with wavelength in a certain range and also with the characteristic of being not swayed by the bottom layer. At last, the measuring light with the optical instrument works together to detect the mentioned compound film. It is exactly because the measuring light chosen is free from the influence of the bottom layer, the current object ready to be detected can be taken just as the virtual layer. So the result can precisely represent the parameter of the virtual layer, also the concave-convex layer, and the goal of measuring the parameter of a rough film is thus obtained.

DETAILED DESCRIPTION OF THE EMBODIMENT

Figure 1:
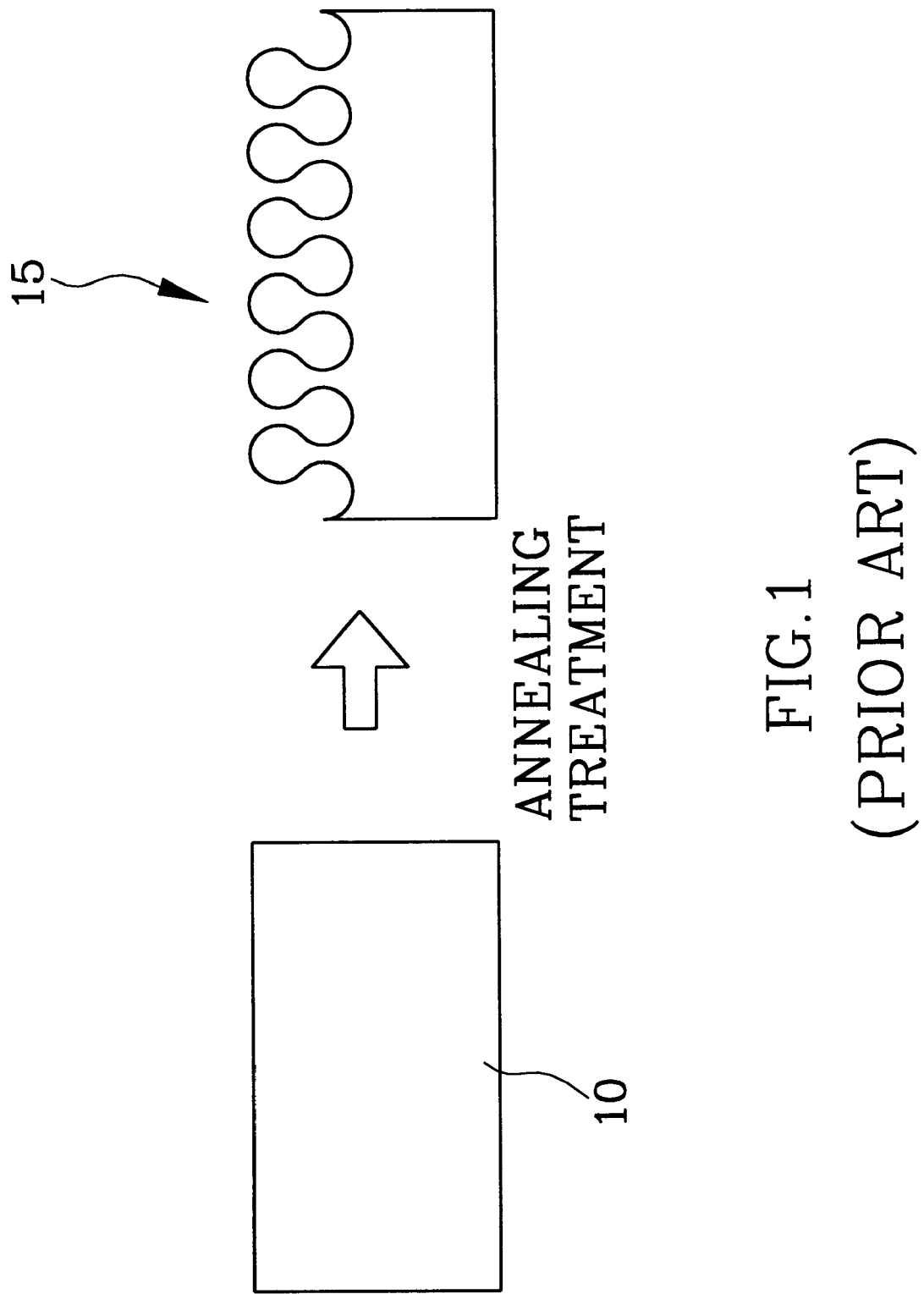
FIG. 1 is a cross-section view of the process in which a rough film in a semiconductor device is formed after annealing an amorphous silicon layer according to the prior art.
Figure 2:
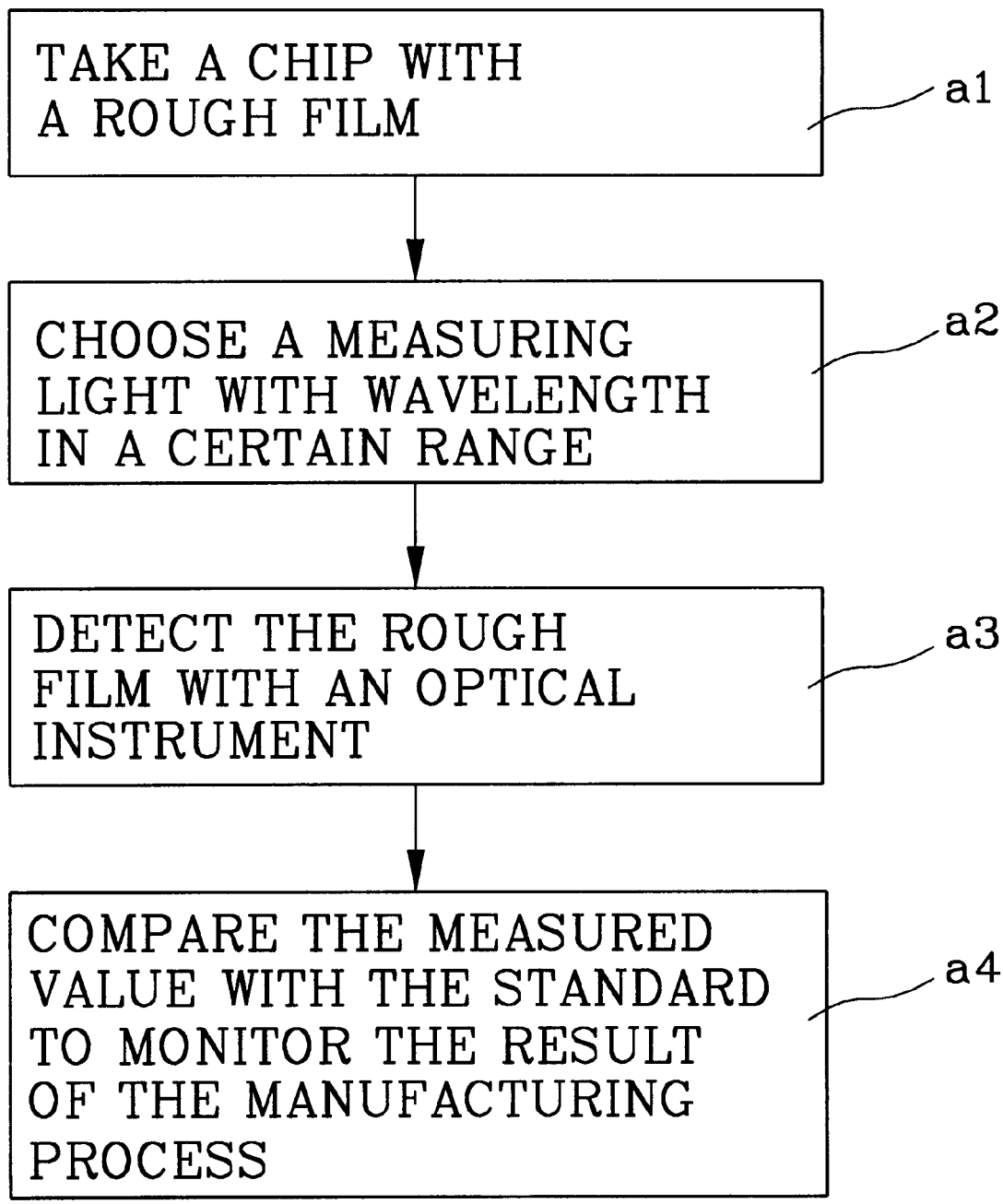
FIG. 2 is a procedure flow chart of the first embodiment according the present invention.

The current invention is about a method for measuring the parameter of a rough film. It can be applied in surface-measurement in the semiconductor film, and particularly fit for the technology used to enhance the capacitance of a capacitor with HSG. That is, this invention is used to " measure the roughness of the capacitor with HSG in the semiconductor film. It is by choosing a measuring light with an optical instrument to detect the property of a rough film and assess its stability for further treatment. In details, the present invention has two major embodiments—in-line monitoring and off-line monitoring—as stated in the following:

For the first part, the approach of off-line monitoring is presented as the first embodiment, whose procedure flowchart is illustrated in FIG. 2, including 4 steps. Firstly, take a chip with a rough film (a1), that is, an uneven film and then choose a measuring light with wavelength in a certain range (a2) to detect the optical property of the rough film by an optical instrument (a3). Whether or not the manufacturing process of the rough films is good or bad can be assessed by comparing the measured value with the standard (a4). The optical instrument mentioned in step a3 is a spectroscopic ellipsometer (SEM). In addition, the rough film [said before] is an uneven film, that is, a HSG surface structure, mainly applied in semiconductor realm to enhance the capacitance of a capacitor.

Figure 3:
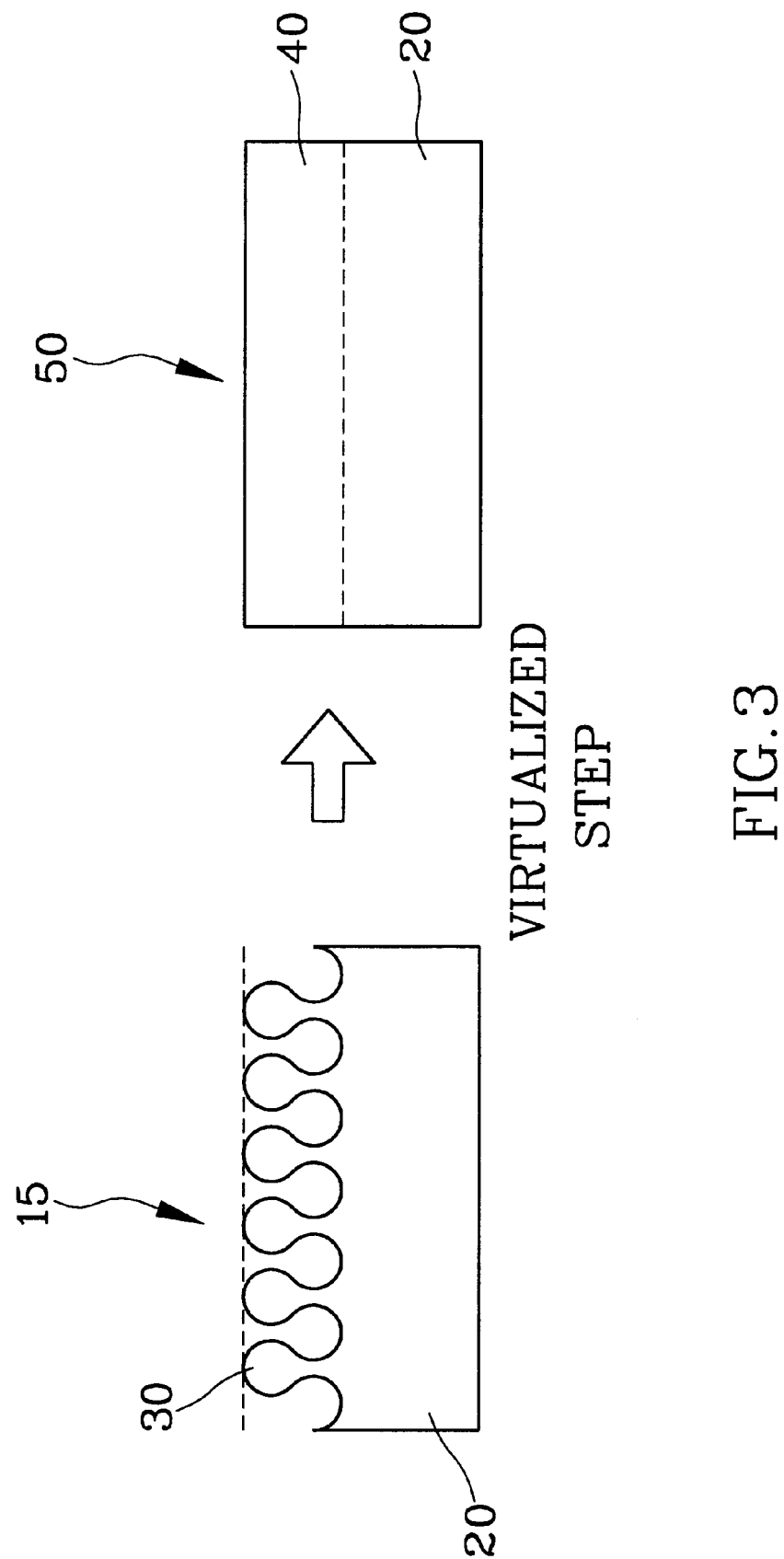
FIG. 3 represents the diagram where the rough film is made virtualized a macroscopically smooth and even film according the first embodiment.

However, exactly between the step (a1) and (a2), something is further included that is, the HSG is virtualized as a thin film which is microscopically smooth and uniform, as shown in FIG. 3. The rough film 15 comprises a concave-convex layer 30 and a bottom layer 20, and the concave-convex layer 30 is microscopically assumed to be a smooth virtual layer 40 whose thickness is the very height difference of the concave-convex layer 30. Therefore, the rough film 15, that is, the uneven film can be viewed as simply as a smooth compound film 50 composed of the mentioned virtual layer 40 and the bottom layer 20.

The optical instrument, spectroscopic ellipsometer (SEM), mentioned in the first embodiment is doing its job of defining a virtual index-optical-curve by its frequency characteristic, such as the refraction index-N or the extinction index-K. Because the measured optical index varies with the thickness of amorphous silicon, a measuring light with wavelength in UV range, 0.22–0.35 micrometer, is chosen to perform this measurement. Because the absorption rate of silicon is extremely high right between the wavelength range of 0.22–0.35 micrometers, so that the " measuring sensor can hardly detect the reflected light from the bottom layer 20. Then the calculation from this set of optical index will be fortunately free from the disturbance due to a change in thickness of amorphous silicon.

Through the method just mentioned, any kind of HSG optical index can be defined, and after adjusting the manufacturing process of the rough film, the standard optical index is derived by comparing with the corresponding optical index curves. Then this standard optical index curve is used for identification of the HSG property. Afterwards, wafer testing can be performed every fixed period of time to measure the property of the rough film. Once the detected optical index curve is drifting away from the HSG identification curve, the engineers can immediately know that the manufacturing process has been got worsen or drifted and a further correction is necessary.

Figure 4:
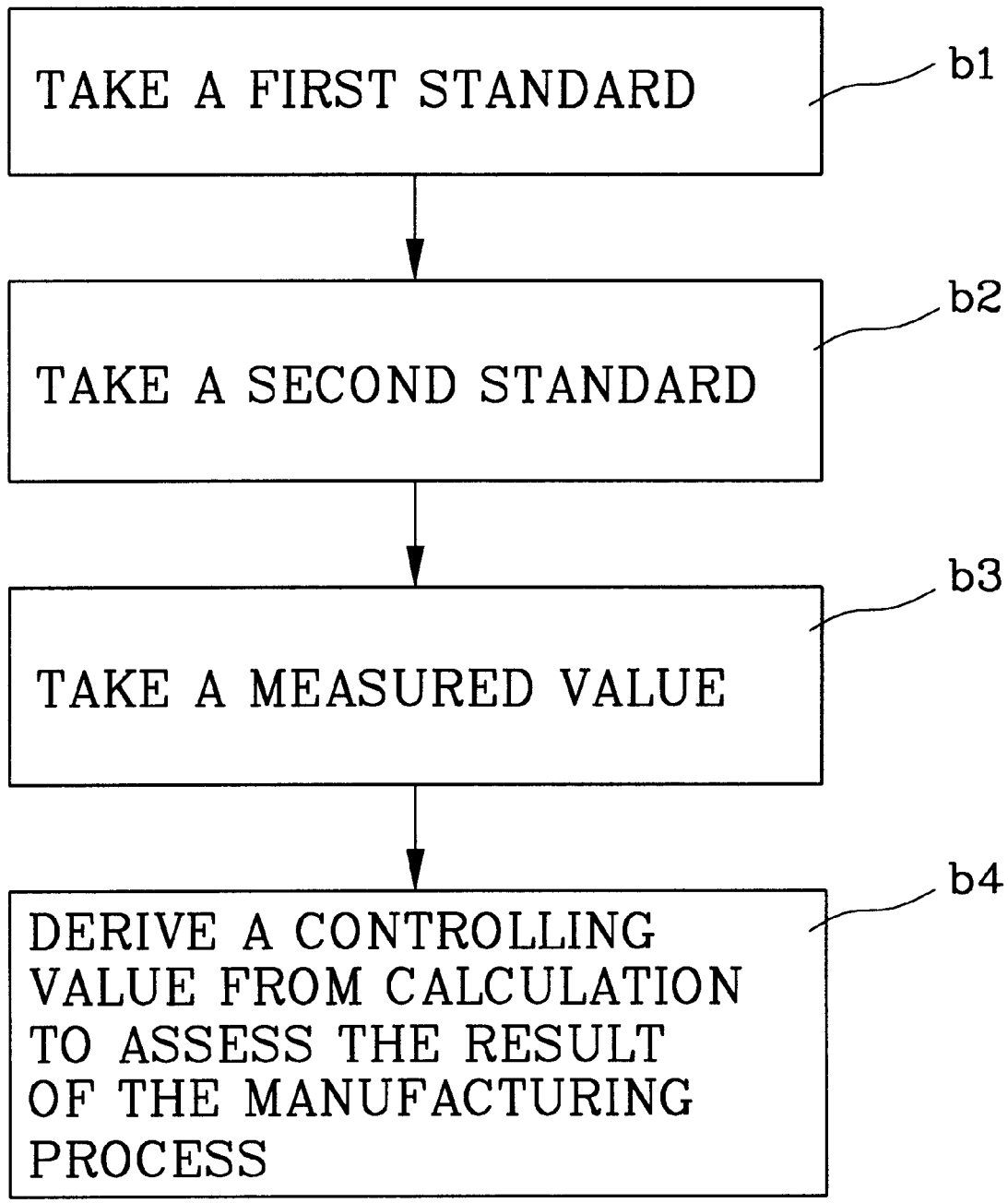
FIG. 4 is a procedure flow chart of the second embodiment according to the present invention.

Another embodiment of in-line monitoring of this invention is as illustrated in FIG. 4. It is a procedure flow chart with the following four steps (a1–a4). At first, a first standard is taken as a base (a1), subsequently a second standard (a2) and a measured value (a3) are taken. Then a controlling value is derived by a formula in which the first standard, the second standard and the measured value are all involved to assess how good the result of the manufacturing process is. The formula is stated as:

Measured value=[(1−controlling value)×the first standard]+[controlling value×the second standard]

By this formula, the controlling value is derived to assess the result of the manufacturing process, which is mainly according to the Bruggeman theory. Where if a new material is composed of two different materials, its optical index can be calculated from the other two well-knowns. By this theory, after introducing both the well-defined standard optical index curve and an additional worse one into the mentioned formula, the derived curve each time is the in-line controlling value. This controlling value will vary between the range of 0 and 1, if near 0, HSG produced from this round approaches the original best one and the process is stable enough, otherwise some other treatment is necessary to correct the process.

In summary, the method for measuring the parameter of a rough film presented in this invention is proposed to offer a handy way to detect the property of a rough film. The effect of the current invention has been proved to be excellent by the practical test of DRAM produced in our company. Thus, its improvement and efficacy are so obvious that the invention is really valuable in industry.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A method for measuring the parameter of a rough film, comprising at least the following steps of:
   (a) providing a chip with a rough film which includes a concave-convex layer and a bottom layer;
   (b) choosing a measuring light with wavelength in a certain range, in which said measuring light has the characteristic of being less influenced by the bottom layer;
   (c) performing measurement to the rough film by an optical instrument and said measuring light with less influence from the bottom layer, and then obtain a measured value which is the parameter of the concave-convex layer;
   (d) providing a first standard and a second standard, wherein said first standard is well-defined standard optical index and said second standard is a lessen standard optical index;

(e) introducing the first standard, the second standard and the measured value into a formula to derive a controlling value, said formula is stated as:

Measured value=[(1−controlling value)×the first standard]+[controlling value×the second standard];

(f) determining if the controlling value is near to zero, and adjusting the manufacturing process accordingly.

2. The method for measuring the parameter of a rough film according to claim 1, wherein the wavelength range of said measuring light is between 0.22 and 0.35 micrometers.

3. The method for measuring the parameter of a rough film according to claim 2, wherein said optical instrument is a spectroscopic ellipsometer.

4. The method for measuring the parameter of a rough film according to claim 1, wherein said optical instrument is a spectroscopic ellipsometer.

5. The method for measuring the parameter of a rough film according to claim 4, wherein said controlling value varies between 0 and 1.

6. The method for measuring the parameter of a rough film according to claim 1, wherein said controlling value varies between 0 and 1.

* * * * *